United States Patent

Takahata et al.

(10) Patent No.: US 9,553,299 B2
(45) Date of Patent: Jan. 24, 2017

(54) LITHIUM-ION SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 242 days.

(21) Appl. No.: 14/235,471

(22) PCT Filed: Jul. 29, 2011

(86) PCT No.: PCT/JP2011/067535
§ 371 (c)(1),
(2), (4) Date: Jan. 28, 2014

(87) PCT Pub. No.: WO2013/018180
PCT Pub. Date: Feb. 7, 2013

(65) Prior Publication Data
US 2014/0170487 A1    Jun. 19, 2014

(51) Int. Cl.
*H01M 4/587* (2010.01)
*H01M 4/04* (2006.01)
(Continued)

(52) U.S. Cl.
CPC ........... *H01M 4/0404* (2013.01); *H01M 4/133* (2013.01); *H01M 4/1393* (2013.01);
(Continued)

(58) Field of Classification Search
CPC ............................ H01M 4/133; H01M 4/587
See application file for complete search history.

(56) References Cited

U.S. PATENT DOCUMENTS

| 2004/0072076 A1 | 4/2004 | Matsubara et al. |
| 2007/0148550 A1* | 6/2007 | Hasegawa ............ H01M 4/133 429/245 |
| 2013/0157090 A1 | 6/2013 | Kuroda |

FOREIGN PATENT DOCUMENTS

| CN | 101662014 A | 3/2010 |
| JP | 9-245770 | 9/1997 |

(Continued)

OTHER PUBLICATIONS

U.S. Appl. No. 14/130,713 which entered the U.S. national phase on Jan. 3, 2014.

(Continued)

*Primary Examiner* — Stewart Fraser
(74) *Attorney, Agent, or Firm* — Finnegan, Henderson, Farabow, Garrett & Dunner, LLP

(57) ABSTRACT

A negative electrode sheet of a lithium-ion secondary battery has a negative electrode current collector and a negative electrode active material layer on the negative electrode current collector. The negative electrode active material layer contains flake graphite particles and has a first region neighboring the negative electrode current collector and a second region neighboring a surface side that are different in perpendicularity of the graphite particles. The perpendicularity of the graphite particles is defined as (m1/m2), where, when the inclination θn of each of the graphite particles is specified relative to a surface of the negative electrode current collector, m1 is the number of the graphite particles having an inclination θn of 60°≤θn≤90° and m2 is the number of the graphite particles having an inclination θn of 0°≤θn≤30°.

11 Claims, 15 Drawing Sheets

(51) Int. Cl.
*H01M 4/133* (2010.01)
*H01M 4/1393* (2010.01)
*H01M 4/36* (2006.01)
*H01M 10/0525* (2010.01)

(52) U.S. Cl.
CPC .......... *H01M 4/364* (2013.01); *H01M 4/587* (2013.01); *H01M 10/0525* (2013.01); *Y02E 60/122* (2013.01); *Y02P 70/54* (2015.11); *Y02T 10/7011* (2013.01)

(56) References Cited

FOREIGN PATENT DOCUMENTS

| | | |
|---|---|---|
| JP | 2002-231316 | 8/2002 |
| JP | 2003-197182 | 7/2003 |
| JP | 2003-197189 | 7/2003 |
| JP | 2004-220926 | 8/2004 |
| JP | 2007-200862 | 8/2007 |
| JP | 2010-108716 | 5/2010 |
| JP | 2013-012320 | 1/2013 |
| WO | WO 2012/029144 A1 | 3/2012 |

OTHER PUBLICATIONS

Office Action issued in U.S. Appl. No. 14/130,713 dated Dec. 7, 2015.
Office Action issued in U.S. Appl. No. 14/130,713 dated Apr. 25, 2016.
Notice of Allowance issued in U.S. Appl. No. 14/130,713 on Jul. 22, 2016.

\* cited by examiner

LITHIUM-ION SECONDARY BATTERY

CROSS-REFERENCE TO RELATED APPLICATIONS

This application is a national phase application of International Application No. PCT/JP2011/067535, filed Jul. 29, 2011, the content of which is incorporated herein by reference.

TECHNICAL FIELD

The present invention relates to lithium-ion secondary batteries. In the present description, the term "secondary battery" refers to a repeatedly chargeable storage device in general. Further, in the present description, the term "lithium ion secondary battery" refers to a secondary battery in which lithium ions are used as electrolyte ions and charging and discharging are implemented by the transfer of electrons accompanying lithium ions between positive and negative electrodes.

BACKGROUND ART

Regarding such a lithium-ion secondary battery, JP 2003-197189 A, for example, discloses a method of manufacturing a negative electrode for the lithium-ion secondary battery. The method of manufacturing the negative electrode includes coating a substrate material with a paste in which graphite powder and a binder agent are dispersed in a solvent. Next, the (002) planes of graphite particles contained in the graphite powder are aligned in the same direction in a magnetic field. Then, in this state, the solvent is removed and the graphite powder is solidified by the binder agent.

According to such a manufacturing method of the lithium-ion secondary battery, the (002) planes of the graphite particles contained in the negative electrode are oriented with each other in the same direction between the graphite particles, and the positive electrode can be disposed in the direction of the (002) planes. For that reason, it is stated that the lithium ions transferred between the negative electrode and the positive electrode can smoothly enter the interspace between the layers from the edge portion of the graphite layer.

Likewise, JP 2003-197182 A, JP 2004-220926 A, and JP H09 (1997)-245770 A, for example, disclose that, in the negative electrode for lithium-ion secondary batteries, graphite particles are magnetic-field aligned to cause the 002 planes of the graphite particles stand upright relative to the negative electrode current collector.

CITATION LIST

Patent Literature

[Patent Literature 1] JP 2003-197189 A
[Patent Literature 2] JP 2003-197182 A
[Patent Literature 3] JP 2004-220926 A
[Patent Literature 4] JP H09 (1997)-245770 A

SUMMARY OF INVENTION

Technical Problem

Lithium-ion secondary batteries have been incorporated in automobiles such as hybrid electric vehicles, plug-in hybrid vehicles, and what is called electric vehicles, as the power source for the mechanism for driving the automobiles. In such an application as the vehicle drive battery, it is required to lower the reaction resistance during charge and discharge, for example, in order to improve the energy efficiency. In addition, when accelerating the automobile quickly, the amount of discharge increases drastically. For this reason, it is preferable that the discharge resistance at high rates be kept low. In such a viewpoint, with the negative electrode of the lithium-ion secondary battery, the direct current resistance of the lithium-ion secondary battery tends to be poor merely when the 002 planes of the graphite particles are caused to stand upright relative to the negative electrode current collector by magnetic-field aligning.

Solution to Problem

A lithium-ion secondary battery according to the present invention has a negative electrode current collector and a negative electrode active material layer formed on the negative electrode current collector. The negative electrode active material layer contains flake graphite particles and has a first region neighboring the negative electrode current collector and a second region neighboring a surface side thereof, the first region and the second region differing in perpendicularity of the graphite particles.

In this case, for example, the first region may be defined as a 0%-30% thickness region of the negative electrode active material layer from the negative electrode current collector, and the second region may be defined as a 70%-100% thickness region of the negative electrode active material layer from the negative electrode current collector.

In addition, it is desirable that the perpendicularity of the graphite particles be (m1/m2), where m1 is the number of the graphite particles having an inclination $\theta n$ of $60° \leq \theta n \leq 90°$ relative to a surface of the negative electrode current collector, and m2 is the number of the graphite particles having an inclination $\theta n$ of $0° \leq \theta n \leq 30°$ relative to the surface of the negative electrode current collector.

In this case, for example, it is desirable that the inclination $\theta n$ of each graphite particle relative to the negative electrode current collector should be determined by: preparing cross-sectional SEM images of a plurality of cross sections of the negative electrode active material layer formed on the negative electrode current collector; sampling a predetermined number of largest graphite particles in descending order of apparent cross-sectional area in the cross-sectional SEM images of the plurality of cross sections; and determining an inclination of each of the sampled graphite particles relative to the surface of the negative electrode current collector based on a straight line along the maximum diameter of the sampled graphite particle in a cross section.

It is desirable that the absolute value of a difference (N2−N1) between the perpendicularity N1 of the graphite particles in the first region and the perpendicularity N2 of the graphite particles in the second region be, for example, equal to or greater than 0.2.

It is also possible that the perpendicularity N1 of the graphite particles in the first region may be: N1≤1, and the perpendicularity N2 of the graphite particles in the second region may be: N2≥1.2. In this case, it is desirable that that the perpendicularity N2 of the graphite particles 710A in the second region A2 be: N2≥3.0. This makes it possible to keep the diffusion resistance of the lithium-ion secondary battery low.

Also in this case, it is desirable that the difference (N2−N1) between the perpendicularity N2 of the graphite particles 710A in the second region A2 and the perpendicularity N1 of the graphite particles 710A in the first region A1 be: (N2−N1)≥1.4. It is more desirable that the difference (N2−N1) be: (N2−N1)≥2.5. This enables to obtain a lithium-ion secondary battery that can keep the diffusion resistance low more reliably.

It is also possible that the perpendicularity N1 of the graphite particles in the first region may be: N1≥1.2, and the perpendicularity N2 of the graphite particles in the second region may be: N2≤0.9. In this case, the capacity retention ratio can be maintained to be high, and at the same time, the resistance increase rate can be kept low. In this case, it is possible that the difference (N2−N1) between the perpendicularity N2 of the graphite particles 710A in the second region A2 and the perpendicularity N1 of the graphite particles 710A in the first region A1 be: (N2−N1) may be ≤−0.8.

It is desirable that a method of manufacturing such a lithium-ion secondary battery may comprise a step A of preparing a negative electrode mixture in which at least flake graphite particles and a binder are mixed in a solvent, and a step B of coating the negative electrode mixture produced in the step A onto the negative electrode current collector, to form a negative electrode active material layer on the negative electrode current collector. In this case, it is desirable that the step B include a coating step of coating the negative electrode mixture onto the negative electrode current collector, a drying step of drying the negative electrode mixture having been coated on the negative electrode current collector, and an aligning step of adjusting an orientation of the graphite particles in the coated negative electrode mixture by applying a magnetic field thereto. It is also desirable that the coating step and the drying step be performed at least two times to overlay and coat the negative electrode mixture one over another onto the negative electrode current collector, and that the aligning step be performed at least one time after the coating step and before the drying step.

In addition, the aligning step may be performed after the final coating step and before the final drying step, to cause the graphite particles in the negative electrode mixture coated in the final coating step to stand upright relative to the negative electrode current collector. This enables to form a negative electrode active material layer with a high perpendicularity of graphite particles in the second region neighboring the surface side. In this case, it is possible to provide a pressure-rolling step of pressure-rolling a layer of the negative electrode mixture formed on the negative electrode current collector before the final coating step. This makes it possible to form a negative electrode active material layer in which the difference in the perpendicularity of the graphite particles in the first region neighboring the negative electrode current collector and the perpendicularity of the graphite particles in the second region.

Moreover, it is also possible that the aligning step be performed after the first-time coating step and before the first-time drying step, to cause the graphite particles in the negative electrode mixture coated in the first-time coating step to stand upright relative to the negative electrode current collector. This enables to form a negative electrode active material layer with a high perpendicularity of graphite particles in the first region neighboring the negative electrode current collector. In this case, it is possible to provide a pressure-rolling step of pressure-rolling a layer of the negative electrode mixture formed on the negative electrode current collector after the final drying step. This makes it possible to form a negative electrode active material layer in which the difference in the perpendicularity of the graphite particles in the first region neighboring the negative electrode current collector and the perpendicularity of the graphite particles in the second region.

DESCRIPTION OF EMBODIMENTS

Here, an example of the structure of a lithium-ion secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

Figure 1:
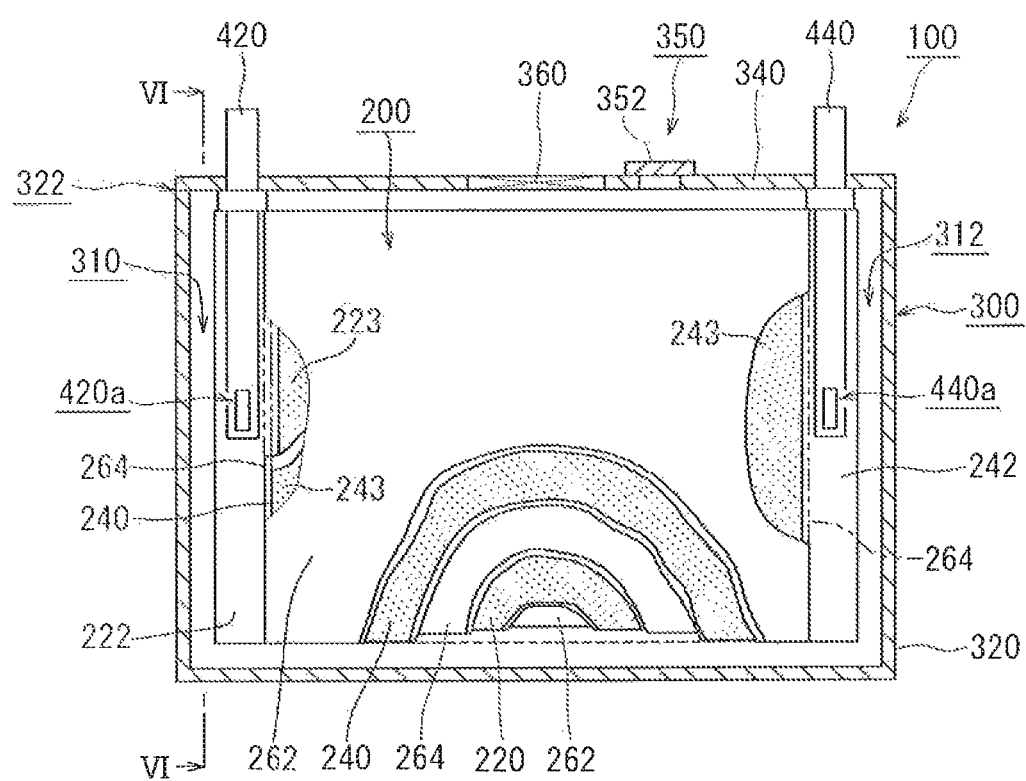
FIG. 1 is a view illustrating one example of the structure of a lithium-ion secondary battery.
Figure 2:
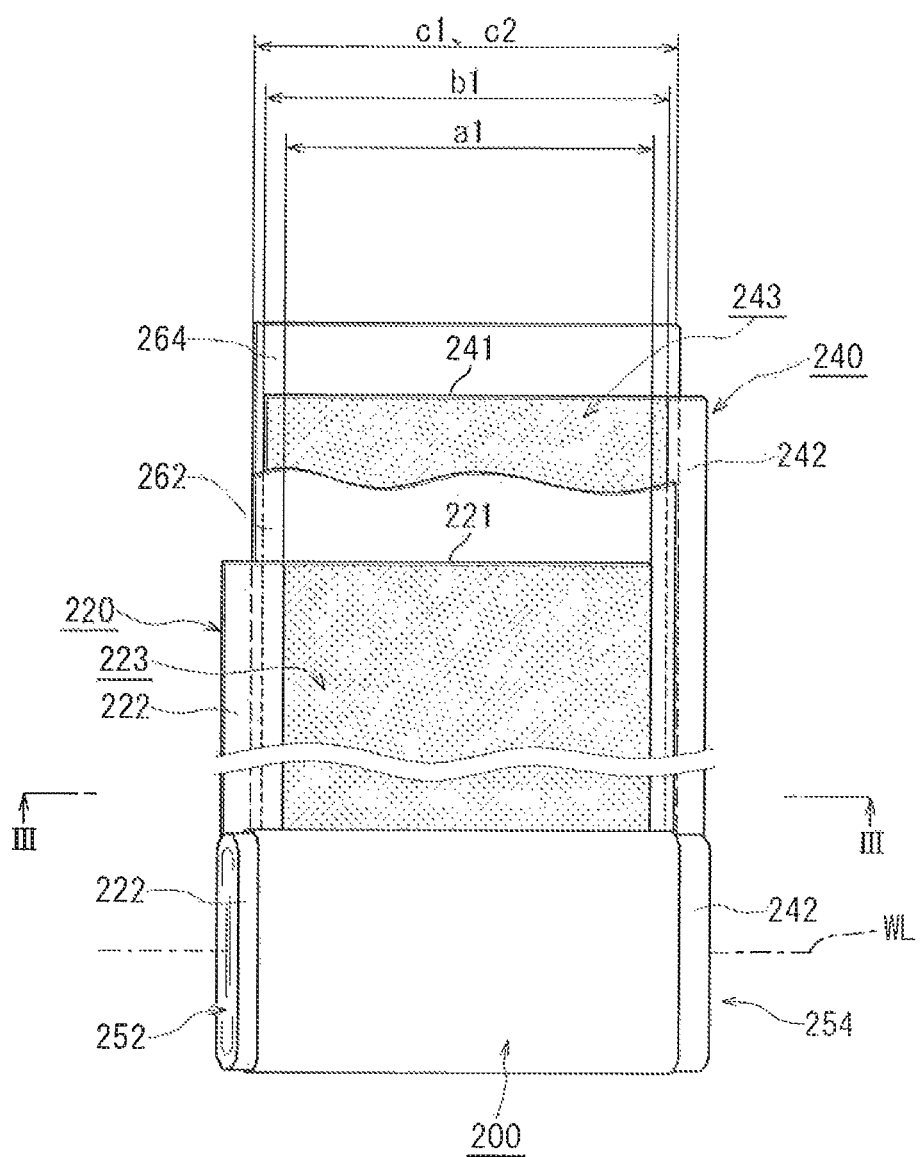
FIG. 2 is a view illustrating a wound electrode assembly of the lithium-ion secondary battery.
Figure 3:
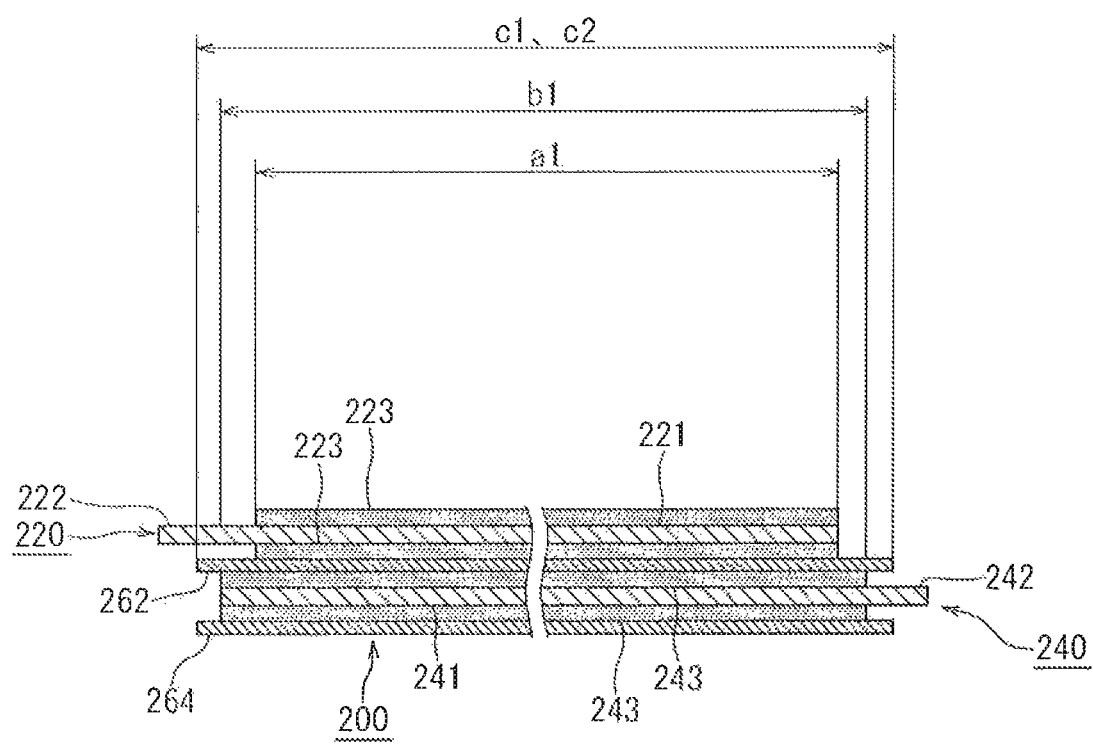
FIG. 3 is a cross-sectional view taken along line in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 and a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 µm. An uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current collector 221, in the example shown in the figure. The positive electrode active material layer 223 contains a positive electrode active material. The positive electrode mixture layer 223 is formed by coating a positive electrode mixture containing the positive electrode active material onto the positive electrode current collector 221.

<<Positive Electrode Active Material Layer 223 and Positive Electrode Active Material Particles 610>>

Figure 4:
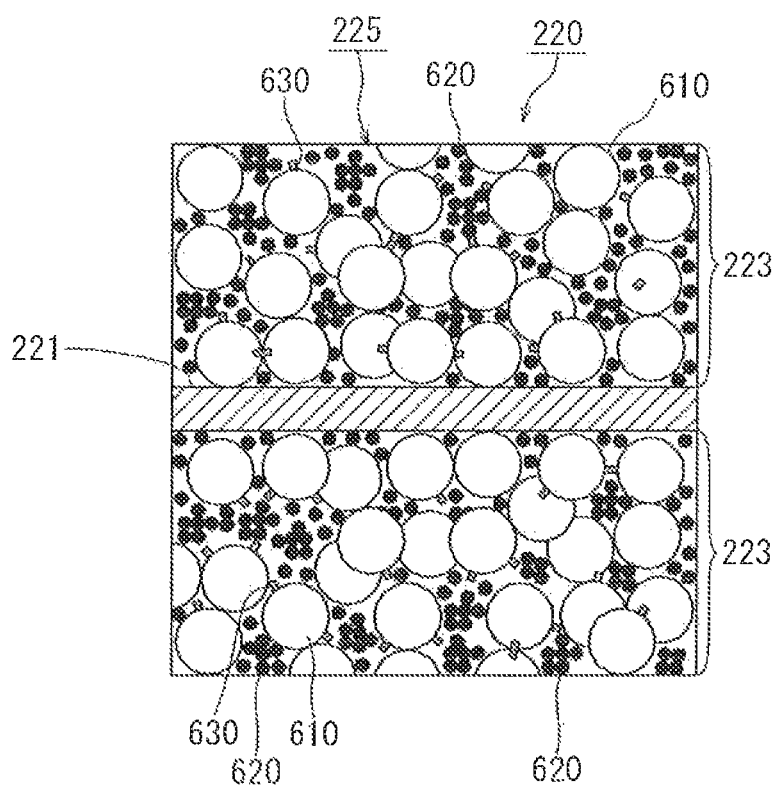
FIG. 4 is a cross-sectional view illustrating the structure of a positive electrode active material layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that the structure of the positive electrode active material layer 223 can be shown clearly. As illustrated in FIG. 4, the positive electrode active material layer 223 contains the positive electrode active material particles 610, the conductive agent 620, and the binder 630.

Various types of substances that can be used as the positive electrode active material of lithium-ion secondary batteries may be used for the positive electrode active material particles 610. Examples of the positive electrode active material particles 610 include lithium transition metal oxides, such as LiNiCoMnO$_2$ (lithium-nickel-cobalt-manganese composite oxide), LiNiO$_2$ (lithium nickel oxide), LiCoO$_2$ (lithium cobalt oxide), LiMn$_2$O$_4$ (lithium manganese oxide), and LiFePO$_4$ (lithium iron phosphate). Here, LiMn$_2$O$_4$ may have, for example, a spinel structure. LiNiO$_2$ and LiCoO$_2$ may have a layered rock-salt structure. LiFePO$_4$ may have, for example, an olivine structure. The LiFePO$_4$ with an olivine structure may have, for example, particles in the range of nanometers. The LiFePO$_4$ with an olivine structure may further be coated with a carbon film.

<<Conductive Agent 620>>

Examples of the conductive agent 620 include carbon materials, such as carbon powder and carbon fiber. As the conductive agent 620, it is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: the positive electrode active material particles 610 and the conductive agent 620 mentioned above are mixed into a paste form (slurry form) in a solvent to prepare a positive electrode mixture, which is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. A strip-shaped copper foil having a predetermined width and a thickness of about 10 µm is used for this negative electrode current collector 241. An uncoated portion 242 is provided along one lateral-side edge of the negative electrode current collector 241. The negative electrode active material layer 243 is formed on both faces of the negative electrode current collector 241 except for the uncoated portion 242, which is provided in the negative electrode current collector 241. The negative electrode mixture layer is retained by the negative electrode current collector 241, and contains at least a negative electrode active material. In the negative electrode active material layer 243, a negative electrode mixture containing a negative electrode active material is coated on the negative electrode current collector 241.

<<Negative Electrode Active Material Layer 243>>

Figure 5:
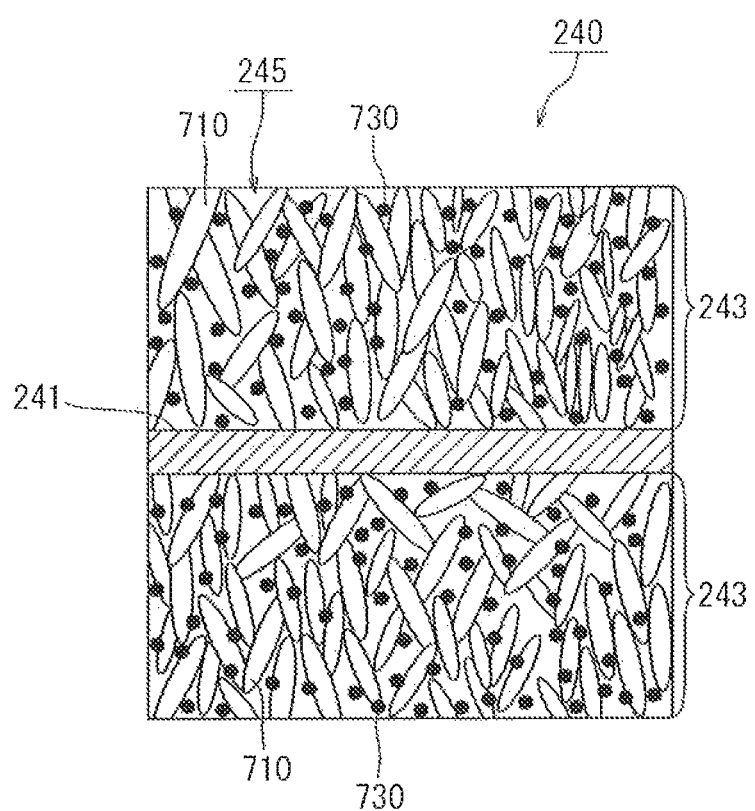
FIG. 5 is a cross-sectional view illustrating the structure of a negative electrode active material layer.

FIG. 5 is a cross-sectional view of the negative electrode sheet 240 of the lithium-ion secondary battery 100. As illustrated in FIG. 5, the negative electrode active material layer 243 contains negative electrode active material particles 710, a thickening agent (not shown), a binder 730, and the like. In FIG. 5, the negative electrode active material particles 710 and the binder 730 in the negative electrode active material layer 243 are enlarged schematically so that the structure of the negative electrode active material layer 243 can be shown clearly.

<<Negative Electrode Active Material Particles 710>>

As the negative electrode active material particles 710, it is possible to use any conventional material used for lithium-ion secondary batteries, either alone or in combination, without any particular limitation. Examples include particulate carbon materials (carbon particles) at least partially containing a graphite structure (a layered structure). More specifically, the negative electrode active material may be natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material particle 710, but the negative electrode active material particle 710 is not limited to the example shown in the figure.

<<Thickening Agent and Solvent>>

The negative electrode active material layer 243 is formed, for example, in the following manner the negative electrode active material particles 710 and the binder 730 mentioned above are mixed into a paste form (slurry form) in a solvent to prepare a negative electrode mixture, which is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The above-mentioned examples of the polymer materials used as the binder 630 of the positive electrode active material layer 223 can also be used for the purpose of obtaining the function as an addition agent, such as a thickening agent for the positive electrode mixture, in addition to the function as the binder.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243. The insulative particles may be made of an insulative inorganic filler (for example, a filler of metal oxide or metal hydroxide) or insulative resin particles (for example, particles of polyethylene or polypropylene).

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. For this reason, a lightweight metal such as aluminum or an aluminum alloy (aluminum in this example) is employed for the case main body 320 and the lid 340, which constitute the battery case 300, in this embodiment. This enables to improve the weight energy efficiency.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
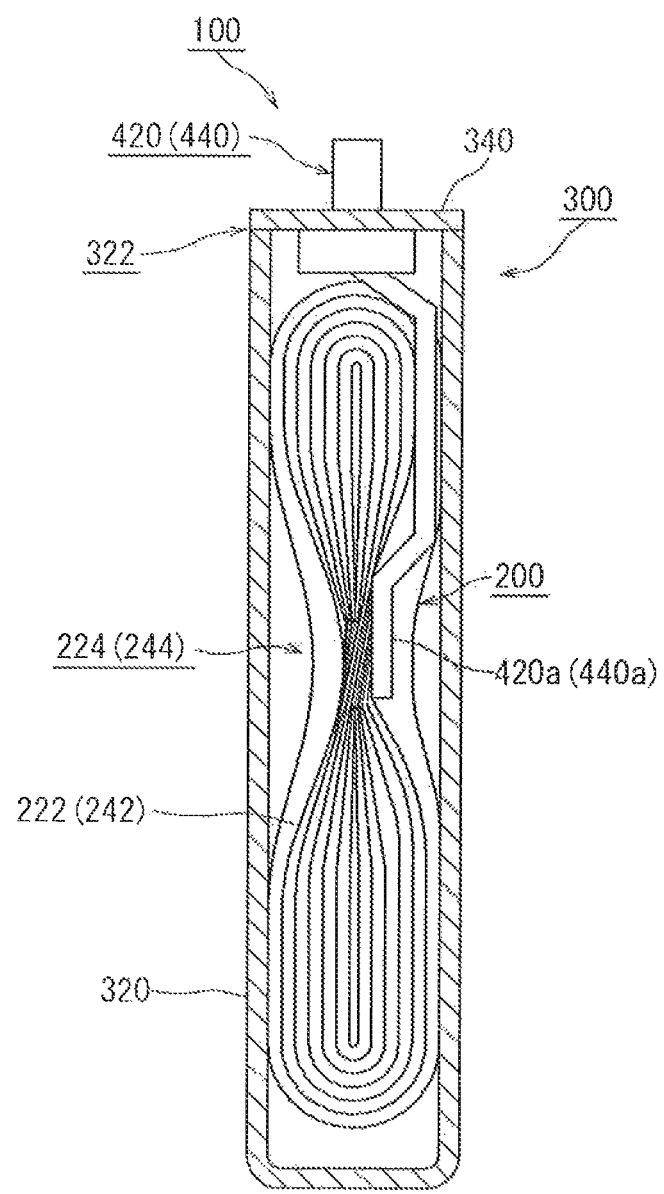
FIG. 6 is a side view illustrating a portion where an uncoated portion of the wound electrode assembly is welded to an electrode terminal.

As illustrated in FIG. 2, the wound electrode assembly 200 is deformed into a flat shape in one direction perpendicular to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line VI-VI in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG.

1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. In this example, the electrolyte solution is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap 352 is attached (welded, for example) to the filling port 350 to seal the battery case 300. It should be noted that the electrolyte solution is not limited to the example of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps, which may be called voids, for example, between the particles of the negative electrode active material particles 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360.

In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation During Charge>>

Figure 7:
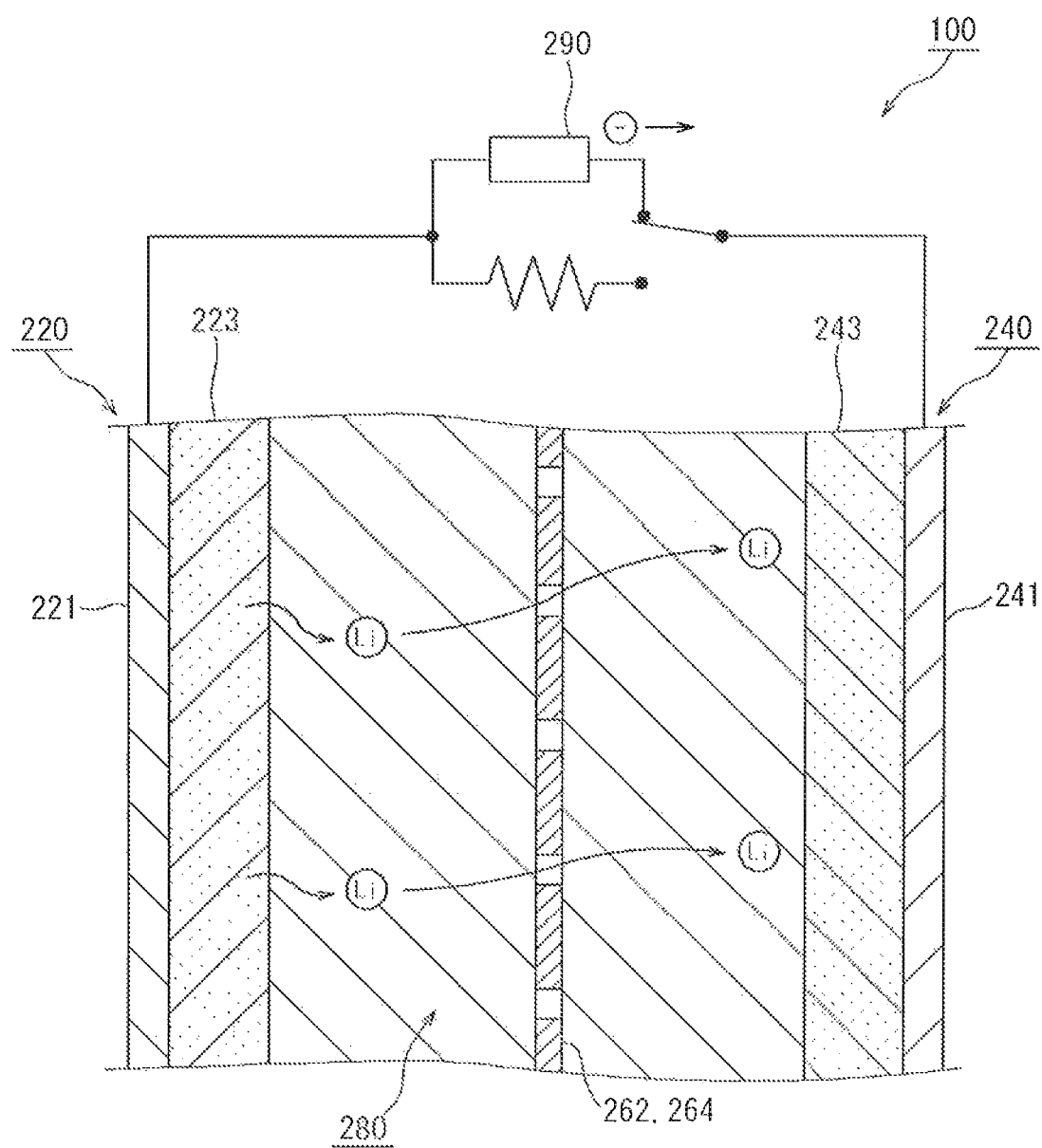
FIG. 7 is a view schematically illustrating a state of the lithium-ion secondary battery during charge.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode sheet 240. In the negative electrode sheet 240, electric charge is stored, and also the lithium ions (Li) in the electrolyte solution 280 are absorbed and stored in the negative electrode active material within the negative electrode active material layer 243.

<<Operation During Discharge>>

Figure 8:
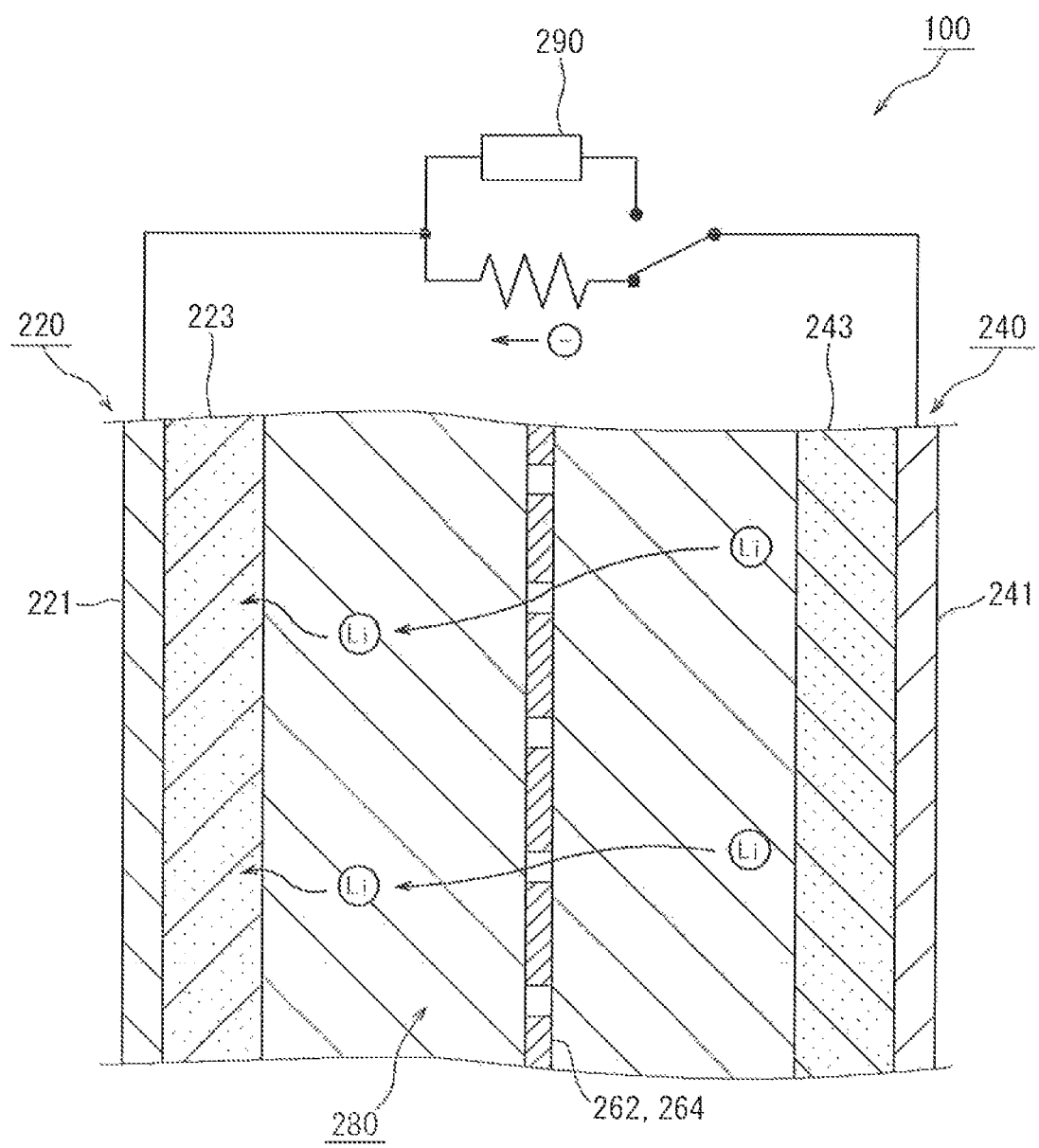
FIG. 8 is a view schematically illustrating a state of the lithium-ion secondary battery during discharge.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. Also, in the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiment. In addition, the electrode sheet in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

Hereinbelow, a lithium-ion secondary battery according to one embodiment of the present invention will be described. The lithium-ion secondary battery described here has the same basic structure as that of the foregoing lithium-ion secondary battery 100. Therefore, the description will be made with reference to the drawings of the foregoing lithium-ion secondary battery 100 as appropriate.

<<Lithium-Ion Secondary Battery 100A>>

Figure 9:
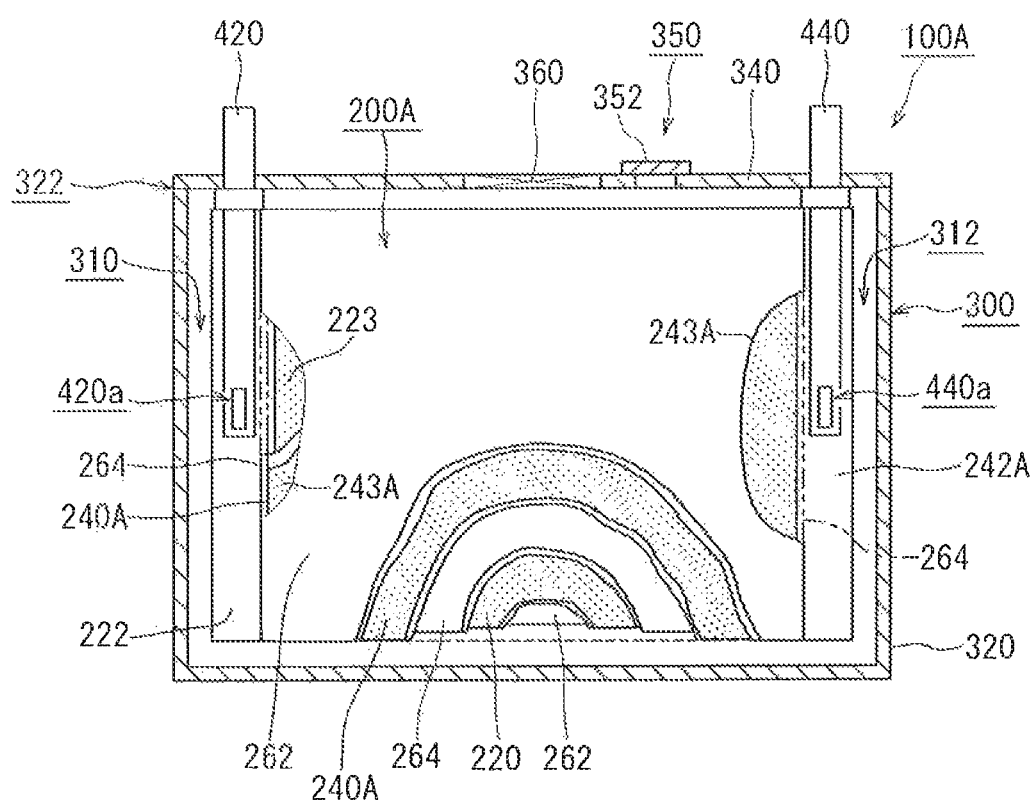
FIG. 9 is a view illustrating a lithium-ion secondary battery according to one embodiment of the present invention.
Figure 10:
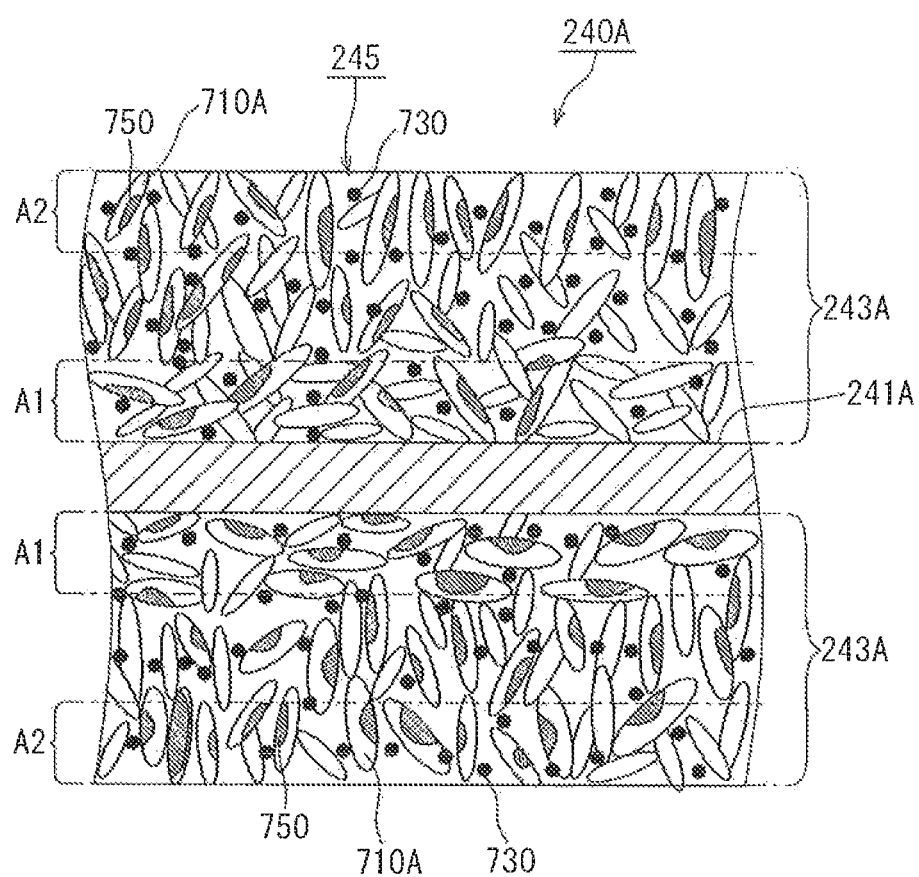
FIG. 10 is a cross-sectional view illustrating the structure of a negative electrode active material layer in the lithium-ion secondary battery according to one embodiment of the present invention.

FIG. 9 illustrates a lithium-ion secondary battery 100A according to one embodiment of the present invention. Referring to FIG. 9, in one embodiment of the present invention, the structure of the negative electrode sheet 240A is different from that of the lithium-ion secondary battery 100 shown in FIG. 1. The uncoated portion of the negative electrode sheet 240A is denoted by reference character 242A. FIG. 10 illustrates a cross-sectional view of the negative electrode sheet 240A of the lithium-ion secondary battery 100A according to one embodiment of the present invention.

<<Graphite Particles 710A>>

This lithium-ion secondary battery 100A has a negative electrode current collector 241A and a negative electrode active material layer 243A formed on the negative electrode current collector 241A. As illustrated in FIG. 10, the negative electrode active material layer 243A contains flake graphite particles (also referred to as "flake graphite") as negative electrode active material particles 710A.

This graphite particle 710A has a layered structure in which carbon hexagonal network planes are stacked to form a plurality of layers. During charge, lithium ions enter the space between the layers in the graphite particle 710A from the edge portions of the graphite particle 710A (the edge portions of the layers) and spread across the space between the layers in the graphite particle 710A.

In this embodiment, the flake graphite particles 710A includes graphite particles at least a portion of each of which is covered by an amorphous carbon film 750, as illustrated in FIG. 10. Here, natural graphite may be an example of the core of the negative electrode active material particle 710A covered by the amorphous carbon film 750.

<<Amorphous Carbon Film 750>>

The amorphous carbon film 750 is a film made of an amorphous carbon material. For example, the graphite particles at least a portion of each of which is covered by the amorphous carbon film 750 can be obtained by mixing pitch with graphite particles that serve as the core of the negative electrode active material particles 710A and baking the mixture.

It is desirable that the weight ratio X of the amorphous carbon film 750 in the negative electrode active material particles 710A be approximately $0.01 \leq X \leq 0.10$. It is more preferable that the weight ratio X of the amorphous carbon film 750 be $0.02 \leq X$. It is more preferable that the upper limit thereof be: $X \leq 0.08$, still more preferably $X \leq 0.06$. This makes it possible to obtain a negative electrode active material particle 710A that is more appropriately covered by the amorphous carbon film 750.

<<Negative Electrode Active Material Layer 243A>>

The negative electrode active material layer 243A has a first region A1 neighboring the negative electrode current collector 241A and a second region A2 neighboring a surface side thereof, for example, as illustrated in FIG. 10, and the first region A1 and the second region A2 differ in perpendicularity Nx of the graphite particles 710A.

<<First Region A1>>

The first region A1 is a region of the negative electrode active material layer 243A neighboring the negative electrode current collector 241A. The first region A1 is, for example, a 0%-30% thickness region of the negative electrode active material layer 243A from the negative electrode current collector 241A. When the thickness of the negative electrode active material layer 243A is about 100 μm, the first region A1 neighboring the negative electrode current collector 241A is a region having a thickness of about 30 μm from the surface of the negative electrode current collector 241A.

<<Second Region A2>>

The second region A2 is a region of the negative electrode active material layer 243A neighboring a surface side thereof. In the battery construction, it is a region of the negative electrode active material layer 243A neighboring the surface that faces the separators 262 and 264 (i.e., facing the positive electrode active material layer 223 (for example, see FIG. 9)). The second region A2 is, for example, a 70%-100% thickness region of the negative electrode active material layer 243A from the negative electrode current collector 241A. In other words, the second region A2 is, for example, a region of the negative electrode active material layer 243A in which the thickness of the negative electrode active material layer 243A is 30% from the surface side. From another viewpoint, the second region A2 is a region of the negative electrode active material layer 243A neighboring the surface facing the separators 262 and 264 (i.e., facing the positive electrode active material layer 223 (see FIG. 9)). For example, when the thickness of the negative electrode active material layer 243A is about 100 μm, the second region A2 neighboring the surface side is a region having a thickness of about 30 μm from the surface of the negative electrode current collector 243A.

<<Perpendicularity Nx of Graphite Particles 710A>>

The perpendicularity Nx of the graphite particles 710A for each of the regions may be obtained in the following manner.

First, cross-sectional SEM images are prepared for a plurality of cross sections of the negative electrode active material layer 243A formed on the negative electrode current collector 241A. Next, in the plurality of cross-sectional SEM images, a predetermined number of largest graphite particles 710A are sampled in descending order of apparent cross-sectional area. Next, for each of the sampled graphite particles 710A, the inclination θn thereof relative to the surface of the negative electrode current collector 241A is determined based on the straight line along the maximum diameter of the sampled graphite particle 710A in the cross section (i.e., the longest distance of the sampled graphite particle 710A in the cross section). Then, the number of the graphite particles 710A having an inclination θn of $60° \leq θn \leq 90°$ is defined as m1, and the number of the graphite particles 710A having an inclination θn of $0° \leq θn \leq 30°$ is defined as m2. Thus, the perpendicularity Nx of graphite particles 710A is defined as (m1/m2).

$$\text{Perpendicularity } Nx \text{ of graphite particles } 710A = (m1/m2)$$

Here, m1 is the number of the graphite particles 710A having an inclination θn of about $60° \leq θn \leq 90°$ relative to the negative electrode current collector 241A, which comparatively stand upright relative to the negative electrode current collector 241A. Also, m2 the number of the graphite particles 710A having an inclination θn of about $0° \leq θn \leq 30°$ relative to the negative electrode current collector 241A, which comparatively lie flat relative to the negative electrode current collector 241A.

Thus, the perpendicularity Nx of graphite particles 710A is evaluated by: (the number of graphite particles 710A comparatively standing upright relative to the negative electrode current collector 241A)/(the number of the graphite particles 710A comparatively lying flat relative to the negative electrode current collector 241A). Therefore, the perpendicularity Nx of graphite particles 710A can serve as an index for evaluating to what degree the graphite particles 710A are upright relative to the negative electrode current collector 241A in the negative electrode active material layer 243A. More specifically, when the perpendicularity Nx is 1, it indicates that the number of the graphite particles 710A that comparatively stand upright relative to the negative electrode current collector 241A and the number of graphite particles 710A that comparatively lie flat are equal to each other. On the other hand, it can be evaluated that the greater than 1 the perpendicularity is, the more upright the graphite particles 710A stand relative to the negative electrode current collector 241A. In contrast, it can be evaluated that the less than 1 the perpendicularity is, the more the graphite particles 710A lie flat relative to the negative electrode current collector 241A.

<<Cross-Sectional SEM Image>>

Here, the cross-sectional SEM images of a plurality of cross sections are prepared when obtaining the perpendicularity Nx of graphite particles 710A. In this case, for example, it is desirable to set a plurality of cross sections in the negative electrode current collector so that they are substantially uniformly arranged as viewed in plan, and to prepare the cross-sectional SEM images of the just-mentioned plurality of cross sections. By preparing cross-sectional SEM images for a plurality of cross sections in this way, the perpendicularity can be evaluated appropriately even when the graphite particles 710A are oriented uniformly in a certain direction.

Figure 11:
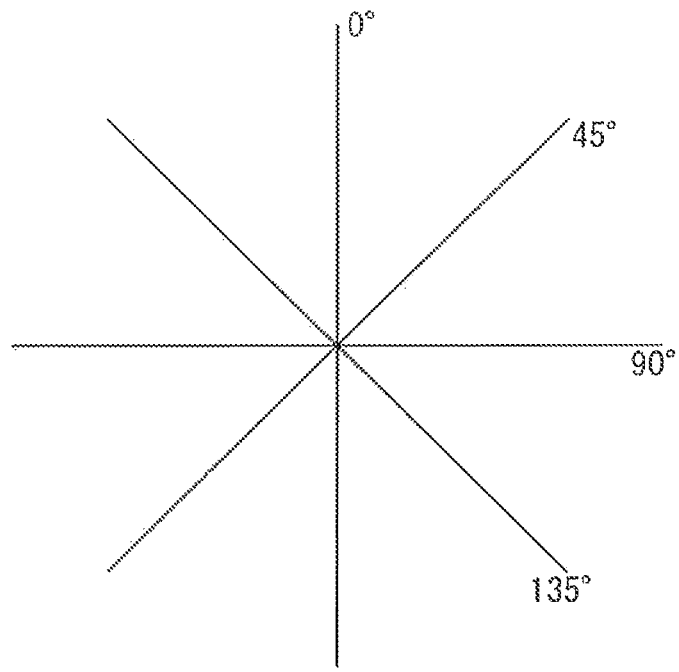
FIG. 11 is a view for illustrating how cross sections are taken when cross-sectional SEM images are obtained.

In this case, for example, for the negative electrode active material layer 243A formed on the negative electrode current collector 241A, cross-sectional SEM images are prepared at four cross sections at 0°, 45°, 90°, and 135° that are arbitrarily set in the negative electrode current collector 241A as viewed in plan, As illustrated in FIG. 11. Here, it is recommended that each of the four cross sections at 0°, 45°, 90°, and 135° be a cross-sectional SEM image of the cross section obtained by cutting the negative electrode active material layer 243A approximately at a predetermined angle.

In FIG. 11, the intersection points of the cross sections agree with each other, but it is not necessary that the intersection points of the cross sections agree with each other. Moreover, although four cross sections that are uniformly arranged at 45° are considered here, it is also possible, for example, to consider six cross sections that are uniformly arranged approximately at 30°. Thus, it is desirable to set a plurality of cross sections in the negative electrode current collector 241A so that they are substantially uniformly arranged as viewed in plan, and to prepare the cross-sectional SEM images of the plurality of cross sections.

<<Sampling of Graphite Particles 710A>>

Next, in the plurality of cross-sectional SEM images, a predetermined number of largest graphite particles 710A are sampled in descending order of apparent cross-sectional area. In this embodiment, a predetermined number of graphite particles 710A are sampled in each of the first region A1 and the second region A2. At this time, a predetermined number of graphite particles 710A are sampled from the graphite particles at least part of which is contained in the first region A1 or the second region A2.

In this embodiment, it is advisable that each of the prepared cross-sectional SEM images contains, for example, 100 or more graphite particles 710A are photographed in each of the first region A1 and the second region A2. Then, it is recommended that, as a predetermined number, about three-tenths of (for example, about 30) largest graphite particles 710A be sampled in descending order of apparent cross-sectional area from each of the first region A1 and the second region A2 in the just-mentioned cross-sectional SEM image.

In this embodiment, the graphite particles 710A are flake graphite and not spherical. In this case, it is highly likely that in a cross-sectional SEM image, a graphite particle 710A having a large apparent cross-sectional area shows the cross section along the longest distance in the graphite particle 710A. Therefore, by sampling about three-tenths of the graphite particles 710A in descending order of apparent cross-sectional area, it is possible to sample the graphite particles 710A showing the cross section along the longest distance.

<<Inclination θn of Graphite Particle 710A>>

Figure 12:
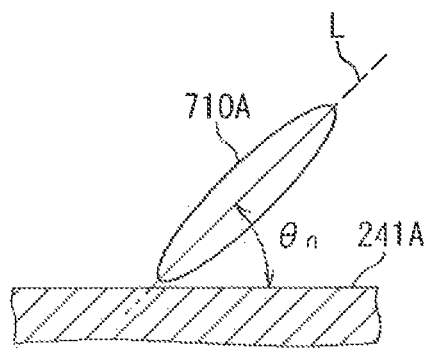
FIG. 12 is a view schematically illustrating a cross section of a sampled graphite particle.

FIG. 12 is a view schematically illustrating a graphite particle 710A sampled in the above-described manner. The inclination θn of the graphite particle 710A relative to the surface of the negative electrode current collector 241A is determined based on the straight line L along the longest distance of the sampled graphite particle 710A.

Then, the number of the graphite particles 710A having an inclination θn of $60°≤θn≤90°$ is defined as m1, the number of the graphite particles 710A having an inclination θn of $0°≤θn≤30°$ is defined as m2, and the perpendicularity Nx of graphite particles 710A is determined by: Nx=(m1/m2). The perpendicularity Nx of graphite particles 710A was measured for each of the first region A1 and the second region A2. Herein, the perpendicularity Nx of the graphite particles 710A in the first region A1 of the negative electrode active material layer 243A is referred to as "N1", and the perpendicularity Nx of the graphite particles 710A in the second region A2 of the negative electrode active material layer 243A is referred to as "N2".

In the negative electrode active material layer 243A, the perpendicularity Nx of the first region A1 neighboring the negative electrode current collector 241A and the perpendicularity Nx of the second region A2 neighboring the surface side thereof are different from each other, as illustrated in FIG. 10, for example.

For example, in the example shown in FIG. 10, the perpendicularity N1 of graphite particles 710A is smaller in the first region A1 neighboring the negative electrode current collector 241A, and the perpendicularity N2 of graphite particles 710A is greater in the second region A2 neighboring the surface side. In other words, in the example shown in FIG. 10, the graphite particles 710A lie flat in the first region A1 neighboring the negative electrode current collector 241A, while the graphite particles 710A stand upright in the second region A2 neighboring the surface side.

Thus, in this embodiment, the first region A1 and the second region A2 differ in perpendicularity Nx of the graphite particles 710A. In such an embodiment, groups of graphite particles 710A having different perpendicularities Nx are mixed in a boundary region between the first region A1 and the second region A2. For this reason, many of the graphite particles 710A come into contact with each other. In this case, it is desirable that the absolute value of the difference (N2−N1) between the perpendicularity N1 of the graphite particles 710A in the first region A1 and the perpendicularity N2 of the graphite particles 710A in the second region A2 be, for example, equal to or greater than 0.2 (i.e., |N2−N1|≥0.2), for example, equal to or greater than 0.3 (|N2−N1|≥0.3). This makes it possible to more reliably obtain the advantageous effects achieved by allowing the perpendicularity N1 of the graphite particles 710A in the first region A1 and the perpendicularity N2 of the graphite particles 710A in the second region A2 to differ from each other.

<<Manufacturing Method of Negative Electrode Active Material Layer 243A>>

The manufacturing method of the negative electrode active material layer 243A includes, for example, a step A of preparing a negative electrode mixture and a step B of forming a negative electrode active material layer 243A on a negative electrode current collector 241A. In the step A, a negative electrode mixture in which at least flake graphite particles 710A and a binder 730 are mixed in a solvent is prepared. In the step B, the negative electrode mixture produced in the step A is coated onto the negative electrode current collector 241A.

More specifically, the step B includes a coating step, a drying step, and an aligning step. The coating step is a step of coating a negative electrode mixture onto the negative electrode current collector 241A. The drying step is a step of drying the negative electrode mixture having been coated on the negative electrode current collector 241A. The aligning step is a step of adjusting an orientation of the graphite particles 710A in the coating negative electrode mixture by applying a magnetic field thereto. In this embodiment, the coating step and the drying step are performed at least two times to overlay and coat the negative electrode mixture one over another onto the negative electrode current collector 241A. The aligning step is preferably performed at least one time after the coating step and before the drying step.

<<Embodiment in which the Graphite Particles 710A Stand Upright in the Second Region A2>>

In this case, the aligning step may be performed after the final coating step and before the final drying step, to cause the graphite particles in the negative electrode mixture coated in the final coating step to stand upright relative to the negative electrode current collector. This makes it possible to manufacture the negative electrode active material layer 243A in which the graphite particles 710A lie flat in the first region A1 neighboring the negative electrode current collector 241A and the graphite particles 710A stand upright in the second region A2 neighboring the surface side.

In this case, it is possible to provide a pressure-rolling step of pressure-rolling a layer of the negative electrode mixture formed on the negative electrode current collector 241A before the final coating step. For example, when the negative electrode mixture is coated onto the negative electrode current collector 241A at two different times, the pressure-rolling step may be performed, for example, after the first-time drying step and before the second-time coating step. This enables the perpendicularity N1 of graphite particles 710A to be made lower in the first region A1 neighboring the negative electrode current collector 241A, and therefore to make the difference between the perpendicularity N1 of the graphite particles 710A in the first region A1 and the perpendicularity N2 of the graphite particles 710A in the second region A2 greater.

In the example shown in FIG. 10, the graphite particles 710A lie flat in the first region A1 neighboring the negative electrode current collector 241A, and the graphite particles 710A stand upright in the second region A2 facing the positive electrode active material layer 223 (see FIG. 9) and neighboring the surface side. As a result, lithium ions easily enter the negative electrode active material layer 243A during charge, and lithium ions are released easily from the negative electrode active material layer 243A during discharge. In addition, in the example shown in FIG. 10, the graphite particles 710A lie flat in the first region A1 neighboring the negative electrode current collector 241A. This allows lithium ions to enter from the surface side of the negative electrode active material layer 243A. Moreover, the lithium ions that have entered the negative electrode active material layer 243A tend to diffuse easily in the first region A1 neighboring the negative electrode current collector 241A, within the negative electrode active material layer 243A.

In the embodiment in which the graphite particles 710A lie flat in the first region A1 and the graphite particles 710A stand upright in the second region A2 as illustrated in FIG. 10, it is desirable that the perpendicularity Nx (m1/m2) of graphite particles 710A in the first region A1 be: (m1/m2)≤1, and the perpendicularity Nx (m1/m2) of graphite particles 710A in the second region A2 be: (m1/m2)≥1.2.

In this case, the perpendicularity Nx (m1/m2) of graphite particles 710A in the first region A1 may be: (m1/m2)≤0.8. More preferably, the perpendicularity Nx (m1/m2) of graphite particles 710A in the first region A1 may be: (m1/m2) ≤0.6.

On the other hand, it is desirable that the perpendicularity Nx (m1/m2) of graphite particles 710A in the second region A2 be: (m1/m2)≥1.5. More preferably, the perpendicularity Nx (m1/m2) of graphite particles 710A in the second region A2 may be: (m1/m2)≥2.0. Still more preferably, the perpendicularity Nx (m1/m2) of graphite particles 710A in the second region A2 may be: (m1/m2)≥3.0.

In this case, the greater the difference (N2−N1) between the perpendicularity N2 of the graphite particles 710A in the second region A2 and the perpendicularity N1 of the graphite particles 710A in the first region A1 is, the lower the diffusion resistance of lithium ions in the lithium-ion secondary battery 100A tends to be. For example, it is desirable that the difference (N2−N1) between the perpendicularity N2 of the graphite particles 710A in the second region A2 and the perpendicularity N1 of the graphite particles 710A in the first region A1 be: (N2−N1)≥1.4. More preferably, it is desirable that the difference (N2−N1) between the perpendicularity N2 of the graphite particles 710A in the second region A2 and the perpendicularity N1 of the graphite particles 710A in the first region A1 be: (N2−N1)≥2.5. Thus, when the difference (N2−N1) between the perpendicularity N2 of the graphite particles 710A in the second region A2 and the perpendicularity N1 of the graphite particles 710A in the first region A1 is positive and the difference is greater, there is a tendency to reduce the diffusion resistance of lithium ions in the lithium-ion secondary battery 100A more significantly.

<<Embodiment in which the Graphite Particles 710A Stand Upright in the First Region A1>>

Figure 13:
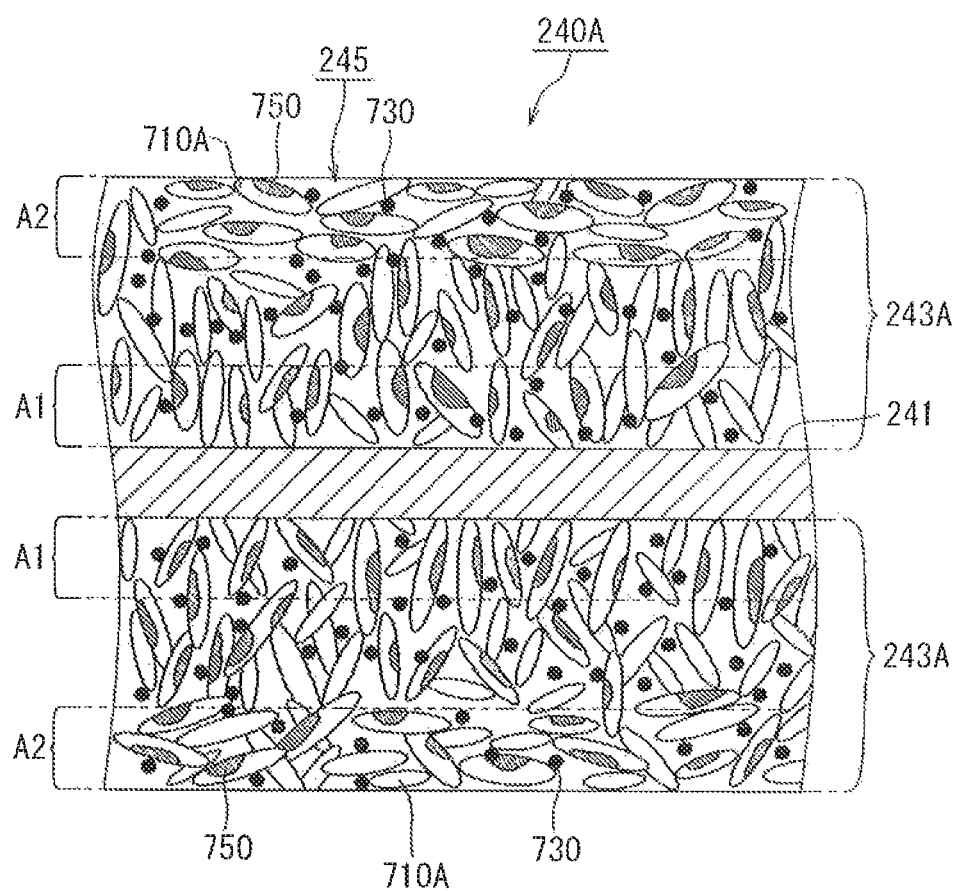
FIG. 13 is a cross-sectional view illustrating another embodiment of the negative electrode active material layer 243A.

FIG. 13 is a cross-sectional view illustrating another embodiment of the negative electrode active material layer 243A. In the example shown in FIG. 13, the graphite particles 710A stand upright in the first region A1 relative to the negative electrode current collector 241A, while the graphite particles 710A lie flat in the second region A2 relative to the negative electrode current collector 241A. In other words, the perpendicularity Nx of graphite particles 710A is greater in the first region A1, and the perpendicularity Nx of graphite particles 710A is smaller in the second region A2.

In this case, it is desirable that the aligning step be performed after the first-time coating step and before the first-time drying step, to cause the graphite particles 710A in the negative electrode mixture coated in the first-time coating step to stand upright relative to the negative electrode current collector 241A. Moreover, in this case, it is desirable that the negative electrode mixture that has been dried in the first-time drying step not be pressure-rolled and the coating step at the second time onward be performed, and further, it is desirable that the negative electrode mixture dried in the final drying step be pressure-rolled. In this case, it is desirable that the amount of pressure-rolling small be kept small to such a degree that the graphite particles 710A in the first region A1 neighboring the negative electrode current collector 241A do not lie flat. This makes it possible to maintain the perpendicularity Nx of graphite particles 710A to be large in the first region A1 neighboring the negative electrode current collector 241A and at the same time to keep the perpendicularity Nx of graphite particles 710A to be smaller in the second region A2 neighboring the surface side. In such a way, by adding the pressure-rolling step as appropriate, the difference in perpendicularity Nx of graphite particles 710A can be adjusted appropriately between the first region A1 and the second region A2 neighboring the surface side.

In the example shown in FIG. 13, the graphite particles 710A stand upright in the first region A1 neighboring the negative electrode current collector 241A, and the graphite particles 710A lie flat in the second region A2 facing the positive electrode active material layer 223 (see FIG. 9) and neighboring the surface side. Therefore, in the negative electrode active material layer 243A, the response of lithium ions is quick in the first region A1 neighboring the negative electrode current collector 241A. As a result, it is possible to obtain a negative electrode active material layer 243A that shows, for example, a high rate of reaction during high rate charge and high rate discharge. Moreover, the lithium ions stored in the negative electrode active material layer 243A are not released easily because the graphite particles 710 lie flat in the second region A2 neighboring the surface side. For this reason, it is easy for the lithium-ion secondary battery 100A (see FIG. 9) to maintain a high capacity.

In this case, it is desirable that the perpendicularity N1 of the graphite particles 710A in the first region A1 be: N1≥1.2, and the perpendicularity N2 of the graphite particles 710A in the second region A2 be: N2≤0.9. As a preferably embodiment, it is desirable that the difference (N2−N1) between the perpendicularity N2 of the graphite particles 710A in the second region A2 and the perpendicularity N1 of the graphite particles 710A in the first region A1 be: (N2−N1)≤−0.8. Thus, when the difference (N2−N1) between the perpendicularity N2 of the graphite particles 710A in the second region A2 and the perpendicularity N1 of the graphite particles 710A in the first region A1 is negative and the absolute value is greater, the capacity retention ratio and the resistance increase rate of the lithium-ion secondary battery 100A tend to be better.

<<Test Cell>>

The present inventors prepared a plurality of samples of the negative electrode sheet 240A. In each of the samples, the negative electrode active material layer 243A was formed such that the perpendicularity N1 of the graphite particles 710A in the first region A1 neighboring the negative electrode current collector 241A and the perpendicularity N2 of the graphite particles 710A in the second region A2 neighboring the surface side are different from each other. Then, using the respective negative electrode sheets 240A, test cells were prepared to evaluate direct current resistance, diffusion resistance, capacity retention ratio, and resistance increase rate. Herein, each of the test cells is a 18650-type battery having a rated capacity of 250 mAh.

<<Positive Electrode of the Test Cell>>

In the positive electrode of the test cell, a 15 μm-thick aluminum foil was used for the positive electrode current collector. The solid content of the positive electrode mixture prepared in forming the positive electrode active material layer was as follows: positive electrode active material: conductive agent:binder=87:10:3 in weight ratio. Particles of $LiNiCoMnO_2$ (lithium-nickel-cobalt-manganese composite oxide) were used as the positive electrode active material, and the same positive electrode active material was used in all the test cells. Acetylene black was used as the conductive agent. Polyvinylidene fluoride (PVDF) was used as the binder.

<<Negative Electrode of the Test Cell>>

In the negative electrode of the test cell, a 10 μm-thick copper foil was used for the negative electrode current collector. The solid content of the negative electrode mixture prepared in forming the negative electrode active material layer was as follows: negative electrode active material: thickening agent:binder=98:1:1 in weight ratio. Here, carboxymethylcellulose (CMC) was used as the thickening agent. Styrene-butadiene rubber (SBR) was used as the binder.

<<Negative Electrode Active Material Particles 710A of the Test Cell>>

Graphite particles used for the negative electrode active material particles 710A of the test cell are the graphite particles at least a portion of each of which is covered with an amorphous carbon film 750 (see FIG. 10), which are obtained by mixing pitch with graphite particles that serve as the core of the negative electrode active material particles 710A and baking the mixture. Each of the test cells employs the negative electrode sheet 240A in which the negative electrode active material layer 243A is formed such that the perpendicularity N1 of the graphite particles 710A in the first region A1 and the perpendicularity N2 of the graphite particles 710A in the second region A2 are different from each other. The test cells are manufactured under the same conditions except for the negative electrode sheet 240A.

The test cells are subjected to predetermined conditioning at first.

<<Conditioning>>

The conditioning is carried out according to the following procedures 1 and 2.

Procedure 1: The test cell is charged with a constant current at 1 C to 4.1 V and thereafter rested for 5 minutes.

Procedure 2: After procedure 1, the test cell is charged with a constant voltage for 1.5 hours and then rested for 5 minutes.

<<Measurement of Rated Capacity>>

After the just-described conditioning, the rated capacity is measured for each of the test cells. The measurement of rated capacity is carried out according to the following procedures 1 through 3. Herein, in order to make the influence of temperature uniform, the rated capacity is measured in a temperature environment at a temperature of 25° C.

Procedure 1: The test cell is discharged with a constant current at 1 C to 3.0 V, then discharged with a constant voltage for 2 hours, and thereafter rested for 10 seconds.

Procedure 2: The test cell is charged with a constant current at 1 C to 4.1 V, then charged with a constant voltage for 2.5 hours, and thereafter rested for 10 seconds.

Procedure 3: The test cell is discharged with a constant current at 0.5 C to 3.0 V, then discharged with a constant voltage for 2 hours, and thereafter rested for 10 seconds.

Rated capacity: The discharge capacity (CCCV discharge capacity) obtained in the discharge process starting from the constant-current discharging and finishing with the constant-voltage discharging in Procedure 3 is defined as the rated capacity. In this test cell, the rated capacity is about 1 Ah.

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: The test cell is charged from 3 V with a constant current at 1 C so as to be in a state of charge of about 60% of the rated capacity (60% SOC).

Procedure 2: After procedure 1, the test cell is charged with a constant voltage for 2.5 hours.

This enables the test cell to be adjusted to a predetermined state of charge.

Next, the direct current resistance, the diffusion resistance, the capacity retention ratio, and the resistance increase rate were evaluated for each of the test cells.

<<Direct Current Resistance>>

Figure 14:
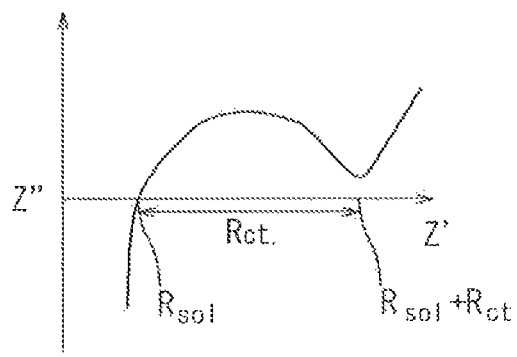
FIG. 14 is a typical graph of Cole-Cole plot (Nyquist plot).

The direct current resistance is the resistance based on the electron resistance and the electrolyte solution resistance in a lithium-ion secondary battery, which can be measured by an alternating current impedance measurement method. FIG. 14 is a view illustrating a typical example of Cole-Cole plot (Nyquist plot) in the alternating current impedance measurement method. As illustrated in FIG. 14, direct current resistance ($R_{sol}$) and reaction resistance ($R_{ct}$) can be calculated based on the Cole-Cole plot obtained by the equivalent circuit fitting in the alternating current impedance measurement. Here, the reaction resistance ($R_{ct}$) can be obtained by the following equation.

$$R_{ct}=(R_{sol}+R_{ct})-R_{sol}$$

These measurements and the calculation of direct current resistance ($R_{sol}$) and reaction resistance ($R_{ct}$) can be carried out using a commercially available apparatus that is programmed in advance. An example of such an apparatus is an electrochemical impedance analyzer made by Solartron Corp. Herein, using a test cell that had been adjusted to 40% SOC (a state of charge of about 40 of the rated capacity), a complex impedance measurement was carried out in a frequency range of $10^{-1}$ Hz to $10^5$ Hz. Herein, as illustrated in FIG. 14, the reaction resistance (Rsol) obtained by equivalent circuit fitting using Nyquist plot is defined as the "direct current resistance".

<<Diffusion Resistance>>

The diffusion resistance is the resistance based on the diffusion of lithium ions, which is measured according to the following procedures. Herein, in order to make the influence of temperature uniform, the rated capacity is measured in a temperature environment at a temperature of 25° C.

Procedure 1: The test cell is adjusted to 60% SOC and CC-discharged (constant-current discharged) at 1 C for 45 seconds, to measure the voltage of the test cell after the discharge.

Procedure 2: The test cell is adjusted to 60% SOC and CC-discharged (constant-current discharged) at 30 C for 45 seconds, to measure the voltage of the test cell after the discharge.

Procedure 3: Obtain the difference between the voltage of the test cell after the discharge obtained in Procedure 1 and that obtained in Procedure 2.

<<Capacity Retention Ratio>>

The capacity retention ratio (post-cycling capacity retention ratio) can be obtained as the ratio (post-cycling capacity)/(initial capacity) between the initial capacity of the test cell adjusted to a predetermined state of charge and the capacity of the test cell after a predetermined number of charge-discharge cycles (also referred to as "post-cycling capacity" herein as appropriate).

Post-cycling capacity retention ratio=(Post-cycling capacity)/(Initial capacity)×100(%)

Here, the "initial capacity" is the discharge capacity that is measured based on a test cell adjusted to 60% SOC at 25° C. Here, the "discharge capacity" is the accumulated capacity (discharge capacity) that is obtained by discharging a test cell at 25° C. from 4.1 V to 3.0 V with a constant current of 1 C and subsequently discharging the cell until the total discharge time reaches 2 hours.

For the "post-cycling capacity", a test cell is allowed to undergo a predetermined charge-discharge cycle in a predetermined temperature environment. Then, based on the test cell after the charge-discharge process, the discharge capacity is measured in a temperature environment of 25° C. The measurement of the "discharge capacity" here follows the measurement of the "discharge capacity" for the initial capacity. Here, the capacity retention ratio (post-cycling capacity retention ratio) is the capacity retention ratio of a test cell after 8000 cycles of a predetermined charge-discharge cycle in a temperature environment of −30° C. For the capacity retention ratio, the test cell is subjected to the above-described conditioning, then constant-current-discharged to 3.0 V, and thereafter charged with a constant current and a constant voltage to adjust the cell to 60% SOC. Thereafter, a predetermined charge-discharge cycle may be carried out.

Herein, one charge-discharge cycle comprises the following procedures (I) through (IV).
(I) The test cell is discharged with a constant current of 30 C for 0.1 seconds (CC-discharging).
(II) The test cell is discharged with a constant current of 5 C for 0.4 seconds (CC-discharging).
(III) The test cell is charged with a constant current of 30 C for 0.5 seconds (CC-charging).
(IV) The test cell is set to 60% SOC by CC-CV discharging at 5 C for 20 seconds.

It is desirable to provide a predetermined interval (for example, for about 10 minutes) between each of the procedures (I) through (IV). In the measurement of the capacity retention ratio at −30° C. after 8000 cycles, one charge-discharge cycle comprising the just-described procedures (I) through (IV) is repeated 8000 times.

<<Resistance Increase Rate>>

The resistance increase rate is also referred to as post-high rate discharge cycling resistance increase rate (high rate discharge deterioration rate). Here, in a temperature environment of about 25° C., the test cell is subjected to the above-described conditioning, then constant-current-discharged to 3.0 V, and thereafter charged with a constant current and a constant voltage to adjust the cell to a SOC (state of charge) of 60% (60% SOC: 60% of the rated capacity). Then, after repeating the high rate charge-discharge process, the resistance increase rate of the test cell is measured. Herein, in order to make the influence of temperature uniform, the high rate deterioration test is carried out in a temperature environment of about 20° C. to 25° C.

One charge-discharge cycle at high rate comprises the following (I) through (V).
(I) The test cell is discharged with a constant current of 30 C for 10 seconds.
(II) The test cell is rested for 10 seconds.
(III) The test cell is charged with a constant current of 5 C for 60 seconds (1 minute).
(IV) The test cell is rested for 10 minutes.
(V) The resistance of the test cell for the discharging in the procedure (I) is measured at every cycle.

One charge-discharge cycle comprising the just-described procedures (I) through (V) is repeated 6000 times. At this time, the test cell is adjusted to 60% SOC as in the above-described manner at every 100 cycles. The high rate discharge resistance increase rate of the test cell is calculated based on the ratio ($\Omega_E/\Omega_1$) of the resistance $\Omega_E$ measured at the 6000th cycle and the resistance $\Omega_1$ measured at the 1st cycle in the high rate charge-discharge cycles.

$$\text{Resistance increase rate} = (\Omega_E/\Omega_1)$$

<<Samples and Evaluation Thereof>>

Figure 15:
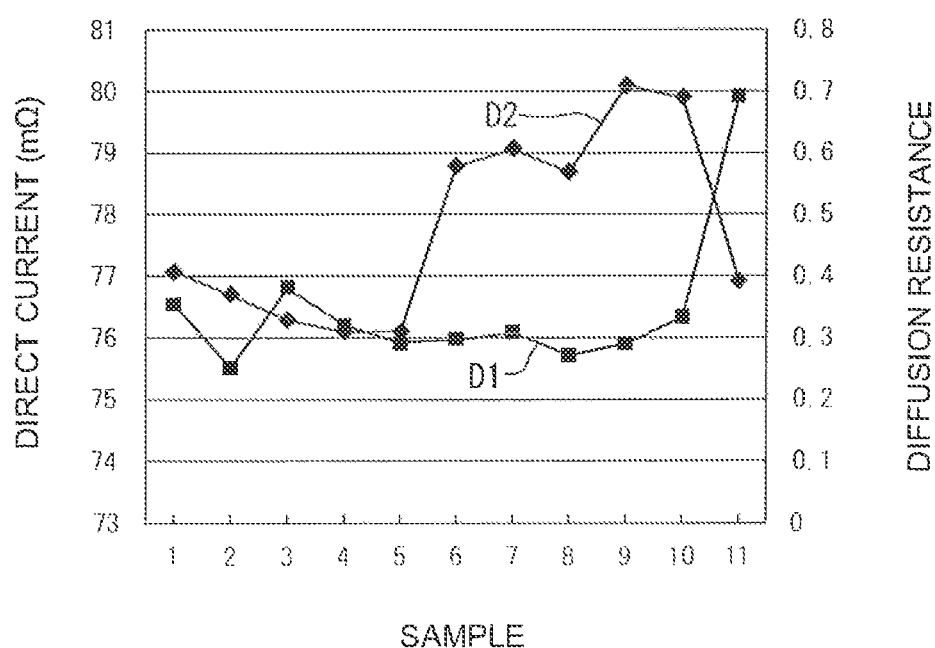
FIG. 15 is a graph in which data in Table 1 are plotted for respective samples.
Figure 16:
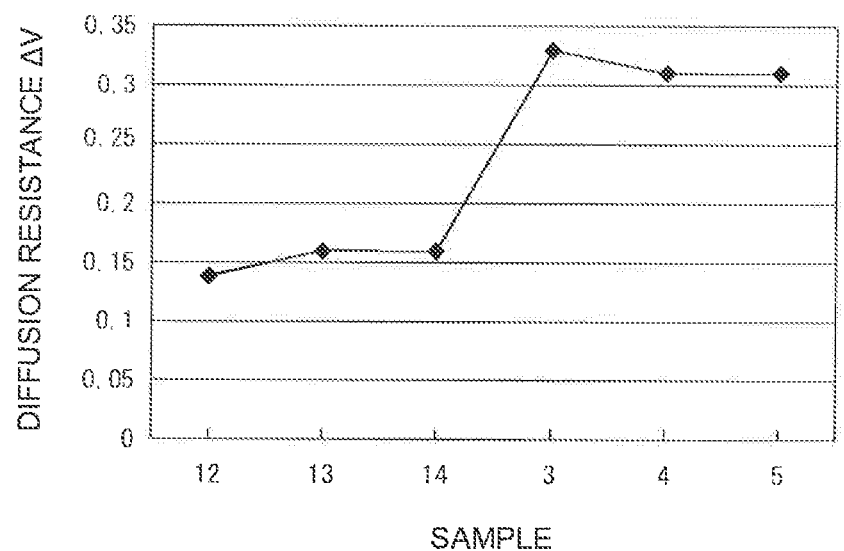
FIG. 16 is a graph in which data in Table 2 are plotted for respective samples.
Figure 17:
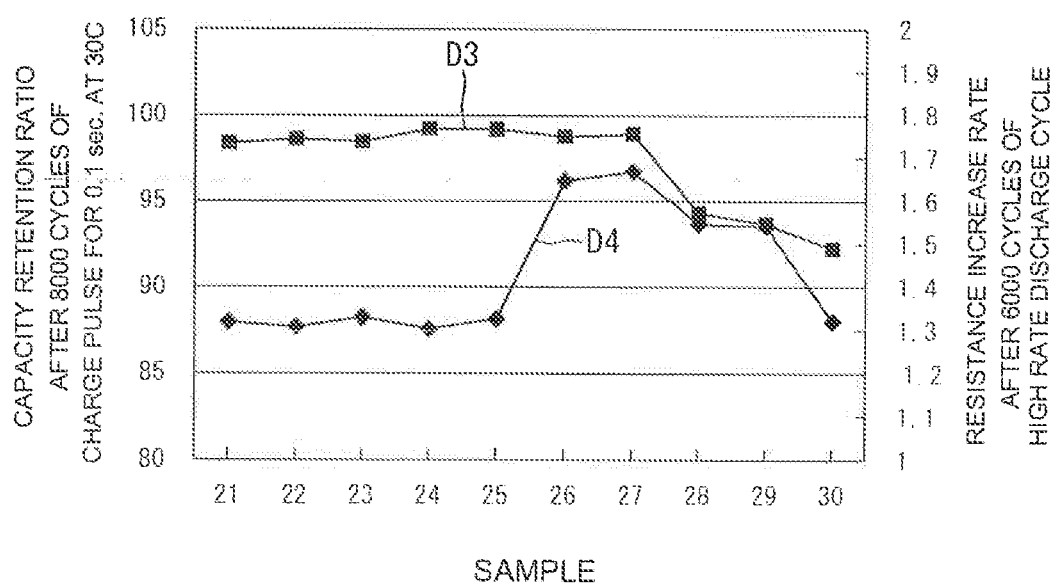
FIG. 17 is a graph in which data in Table 3 are plotted for respective samples.

The present inventors prepared a plurality of test cells, each of which is manufactured using the negative electrode sheet 240A in which the negative electrode active material layer 243A is formed such that the perpendicularity N1 of the graphite particles 710A in the first region A1 and the perpendicularity N2 of the graphite particles 710A in the second region A2 are different from each other. Then, for each of the test cells, the direct current resistance, the diffusion resistance, the capacity retention ratio, and the resistance increase rate were measured. Tables 1 through 3 show the results of the test. FIG. 15 is a graph in which the data in Table 1 are plotted for the respective samples. In FIG. 15, the plot group D1 of black squares "■" represents the direct current resistance, and the plot group D2 of black diamond shapes "◆" represents the diffusion resistance. FIG. 16 is a graph in which the data in Table 2 are plotted for the respective samples. FIG. 17 is a graph in which the data in Table 3 are plotted for the respective samples. In FIG. 17, the plot group D3 of black squares "■" represents the capacity retention ratio, and the plot group D2 of black diamond shapes "◆" represents the resistance increase rate.

TABLE 1

|  | Perpendicularity in first region A1 | Perpendicularity in second region A2 | Difference in perpendicularity (N2 − N1) | Direct current resistance | Diffusion resistance |
| --- | --- | --- | --- | --- | --- |
| Sample 1 | 0.4 | 1.2 | 0.8 | 76.5 | 0.41 |
| Sample 2 | 0.5 | 1.7 | 1.2 | 75.5 | 0.37 |
| Sample 3 | 0.6 | 2 | 1.4 | 76.8 | 0.33 |
| Sample 4 | 0.4 | 2.2 | 1.8 | 76.2 | 0.31 |
| Sample 5 | 0.8 | 2.4 | 1.6 | 75.9 | 0.31 |
| Sample 6 | 0.6 | 0.4 | −0.2 | 76 | 0.58 |
| Sample 7 | 0.5 | 0.3 | −0.2 | 76.1 | 0.61 |
| Sample 8 | 0.4 | 0.8 | 0.4 | 75.7 | 0.57 |
| Sample 9 | 1.2 | 0.4 | −0.8 | 75.9 | 0.71 |
| Sample 10 | 2.2 | 0.5 | −1.7 | 76.3 | 0.69 |
| Sample 11 | 1.3 | 1.5 | 0.2 | 79.9 | 0.39 |

TABLE 2

|  | Perpendicularity in first region A1 | Perpendicularity in second region A2 | Difference in perpendicularity (N2 − N1) | Direct current resistance | Diffusion resistance |
| --- | --- | --- | --- | --- | --- |
| Sample 12 | 0.4 | 3.1 | 2.7 | 75.8 | 0.14 |
| Sample 13 | 0.6 | 3.2 | 2.6 | 75.6 | 0.16 |
| Sample 14 | 0.5 | 3.1 | 2.6 | 75.9 | 0.16 |
| Sample 3 | 0.6 | 2 | 1.4 | 76.8 | 0.33 |
| Sample 4 | 0.4 | 2.2 | 1.8 | 76.2 | 0.31 |
| Sample 5 | 0.8 | 2.4 | 1.6 | 75.9 | 0.31 |

TABLE 3

|  | Perpendicularity in first region A1 | Perpendicularity in second region A2 | Difference in perpendicularity (N2 − N1) | Capacity retention ratio (%) | Resistance increase rate |
| --- | --- | --- | --- | --- | --- |
| Sample 21 | 1.4 | 0.4 | −1 | 98.3 | 1.32 |
| Sample 22 | 1.6 | 0.5 | −1.1 | 98.6 | 1.31 |
| Sample 23 | 1.9 | 0.4 | −1.5 | 98.5 | 1.33 |
| Sample 24 | 2 | 0.6 | −1.4 | 99.1 | 1.3 |
| Sample 25 | 2.4 | 0.7 | −1.7 | 99.2 | 1.33 |
| Sample 26 | 0.6 | 0.4 | −0.2 | 98.7 | 1.65 |
| Sample 27 | 0.5 | 0.3 | −0.2 | 98.9 | 1.67 |
| Sample 28 | 0.4 | 0.8 | 0.4 | 94.3 | 1.55 |
| Sample 29 | 0.6 | 2 | 1.4 | 93.5 | 1.54 |
| Sample 30 | 1.6 | 1.5 | −0.1 | 92.2 | 1.32 |

When the perpendicularity N1 of the graphite particles 710A in the first region A1 neighboring the negative electrode current collector 241A is: N1≤1 and the perpendicularity N2 of the graphite particles 710A neighboring the surface side is: N2≥1.2, the direct current resistance and the diffusion resistance tend to be kept low (for example, samples 1-5).

When both the perpendicularity N1 of the graphite particles 710A in the first region A1 and the perpendicularity N2 of the graphite particles 710A in the second region A2 are from about 0.3 to about 0.8, the diffusion resistance tends to be high (for example, samples 6-8). When the perpendicularity N1 of the graphite particles 710A in the first region A1 is about 1.2 to about 2.2 but the perpendicularity N2 of the graphite particles 710A in the second region A2 is about 0.4 to about 0.5, the diffusion resistance tends to be high (for example, samples 9 and 10). When both the perpendicularity N1 of the graphite particles 710A in the first region A1 and the perpendicularity N2 of the graphite particles 710A in the second region A2 are about 1.3 to about 1.5, the direct current resistance tends to be high (for example, sample 11).

When the perpendicularity N1 of the graphite particles 710A in the first region A1 neighboring the negative electrode current collector 241A is: N1≤1 and the perpendicularity N2 of the graphite particles 710A in the second region A2 is: N2≥3.0, the diffusion resistance tends to decrease significantly (for example, samples 12-14).

It is desirable that the difference (N2−N1) between the perpendicularity N2 of the graphite particles 710A in the second region A2 and the perpendicularity N1 of the graphite particles 710A in the first region A1 be, for example, (N2−N1)≥1.4. In this case, the diffusion resistance tends to be low (for example, samples 3-5). Furthermore, it is desirable that the difference (N2−N1) be: (N2−N1)≥2.0, more preferably (N2−N1)≥2.4. Thereby, the diffusion resistance tends to be remarkably low (for example, samples 12-14).

In addition, it is desirable that the perpendicularity N1 of the graphite particles 710A in the first region A1 be: N1≥1.2, and the perpendicularity N2 of the graphite particles 710A in the second region A2 be: N2≤0.9. Thereby, the capacity retention ratio can be maintained to be high, and the resistance increase rate can be kept low (for example, samples 21-25). In this case, it is possible that the perpendicularity N1 of the graphite particles 710A in the first region A1 may be: N1≥1.4. In addition, it is possible that the perpendicularity N2 of the graphite particles 710A in the second region A2 may be: N2≤0.7. In this case, it is desirable that the difference (N2−N1) between the perpendicularity N2 of the graphite particles 710A in the second region A2 and the perpendicularity N1 of the graphite particles 710A in the first region A1 be: (N2−N1)≤−0.8.

It should be noted that when both the perpendicularity N1 of the graphite particles 710A in the first region A1 and the perpendicularity N2 of the graphite particles 710A in the second region A2 are from about 0.3 to about 0.5, the resistance increase rate tends to be high (for example, samples 26 and 27). Also, when both the perpendicularity N1 of the graphite particles 710A in the first region A1 and the perpendicularity N2 of the graphite particles 710A in the second region A2 are from about 0.4 to about 0.6 and the perpendicularity N2 of the graphite particles 710A in the second region A2 neighboring the surface side is high from about 0.8 to about 2.0, the capacity retention ratio tends to be low (for example, samples 28-30). Therefore, in order to make the capacity retention ratio high and at the same time keep the resistance increase rate low, it is desirable that the perpendicularity N1 of graphite particles 710A in the first region A1 be: N1≥1.2, and the perpendicularity N2 of graphite particles 710A in the second region A2 be: N2≤0.9.

Hereinabove, the lithium-ion secondary battery 100A according to one embodiment of the present invention has been described, but the lithium-ion secondary battery according to the present invention is not limited by any of the foregoing embodiments.

As described above, the present invention contributes to improvements in the output power characteristics of lithium-ion secondary batteries. Therefore, the present invention is suitable for secondary batteries for vehicle-driving power sources, such as batteries for driving hybrid vehicles, which require a high level of output power characteristics at high rate and cycle performance, and further batteries for driving plug-in hybrid vehicles and electric vehicles, which require a particularly high level of capacity.

Figure 18:
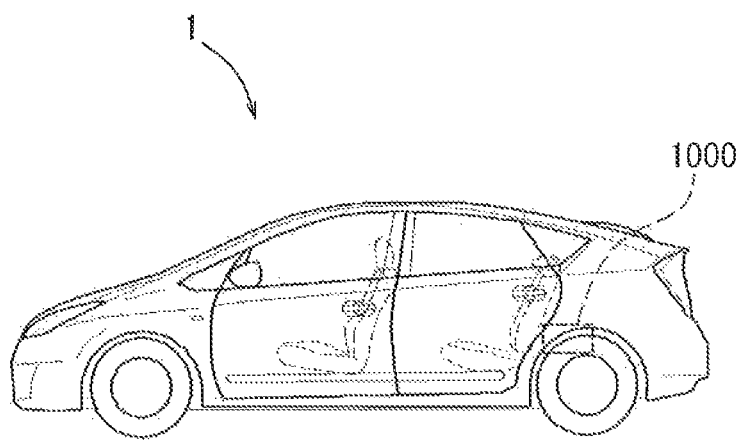
FIG. 18 is a view illustrating a vehicle incorporating a secondary battery.

In this case, as illustrated in FIG. 18, the present invention can be suitably utilized as a vehicle drive battery 1000 in the form of a battery module, in which a plurality of secondary batteries are connected and combined. In particular, in one embodiment of the present invention, the lithium-ion secondary battery can keep the direct current resistance and the diffusion resistance low as appropriate. In addition, in one embodiment of the present invention, the lithium-ion secondary battery can maintain the capacity retention ratio to be high and at the same time keep the resistance increase rate low. For this reason, the lithium-ion secondary battery according to the present invention is particularly suitable as the vehicle drive battery 1000 which requires maintaining the capacity to be high or keeping the resistance increase rate low. The lithium-ion secondary battery according to one embodiment the present invention is suitable for, for example, a lithium-ion secondary battery having a rated capacity of 3.0 Ah or higher as a battery for driving a hybrid vehicle (particularly for a plug-in hybrid vehicle) or an electric vehicle.

REFERENCE SIGNS LIST

1—Vehicle
100, 100A—Lithium-ion secondary battery
200, 200A—Wound electrode assembly
220—Positive electrode sheet
221—Positive electrode current collector
222—Uncoated portion
223—Positive electrode active material layer
224—Intermediate portion
225—Gap (void)
240, 240A—Negative electrode sheet
241, 241A—Negative electrode current collector
242, 242A—Uncoated portion
243, 243A—Negative electrode active material layer
245—Gap (void)
262, 264—Separator
280—Electrolyte solution
290—Charger
300—Battery case
310, 312—Gap
320—Case main body
322—Joint portion between lid and case main body
340—Lid
350—Filling port
352—Sealing cap
360—Safety vent
420—Electrode terminal
420a—Foremost end portion of electrode terminal 420
440—Electrode terminal 440a—Foremost end portion of electrode terminal 440
610—Positive electrode active material particle
620—Conductive agent
630—Binder
710—Negative electrode active material particle
710A—Graphite particle (negative electrode active material particle)
730—Binder
750—Amorphous carbon film
1000—Vehicle drive battery
A1—First region
A2—Second region
WL—Winding axis

The invention claimed is:

1. A lithium-ion secondary battery comprising:
a negative electrode current collector; and
a negative electrode active material layer formed on the negative electrode current collector, wherein
the negative electrode active material layer contains flake graphite particles and has a first region neighboring the negative electrode current collector and a second region neighboring a surface side thereof, the first region and the second region differing in perpendicularity of the graphite particles.

2. The lithium-ion secondary battery according to claim 1, wherein:
the perpendicularity of the graphite particles is obtained by: the perpendicularity of the graphite particles=(m1/m2), where m1 is the number of the graphite particles having an inclination $\theta n$ of $60° \leq \theta n \leq 90°$ relative to a surface of the negative electrode current collector, and m2 is the number of the graphite particles having an inclination $\theta n$ of $0° \leq \theta n \leq 30°$ relative to the surface of the negative electrode current collector.

3. The lithium-ion secondary battery according to claim 2, wherein:
the inclination $\theta n$ of the graphite particles relative to the negative electrode current collector is determined by:
preparing cross-sectional SEM images of a plurality of cross sections of the negative electrode active material layer formed on the negative electrode current collector;
sampling a predetermined number of largest graphite particles in descending order of apparent cross-sectional area, in the cross-sectional SEM images of the plurality of cross sections; and
determining an inclination of each of the sampled graphite particles relative to the surface of the negative electrode current collector based on a straight line along the maximum diameter of the sampled graphite particle in a cross section.

4. The lithium-ion secondary battery according to claim 2, wherein the absolute value of a difference (N2−N1) between the perpendicularity N1 of the graphite particles in the first region and the perpendicularity N2 of the graphite particles in the second region is equal to or greater than 0.2.

5. The lithium-ion secondary battery according to claim 2, wherein the perpendicularity N1 of the graphite particles in the first region is ≤1, and the perpendicularity N2 of the graphite particles in the second region is ≥1.2.

6. The lithium-ion secondary battery according to claim 5, wherein the perpendicularity N2 of the graphite particles in the second region is ≥3.0.

7. The lithium-ion secondary battery according to claim 5, wherein the difference (N2−N1) between the perpendicularity N2 of the graphite particles in the second region and the perpendicularity N1 of the graphite particles in the first region is ≥1.4.

8. The lithium-ion secondary battery according to claim 5, wherein the difference (N2−N1) between the perpendicularity N2 of the graphite particles in the second region and the perpendicularity N1 of the graphite particles in the first region is ≥2.5.

9. The lithium-ion secondary battery according to claim 2, wherein the perpendicularity N1 of the graphite particles in the first region is ≥1.2, and the perpendicularity N2 of the graphite particles in the second region is ≤0.9.

10. The lithium-ion secondary battery according to claim 9, wherein the difference (N2−N1) between the perpendicularity N2 of the graphite particles in the second region and the perpendicularity N1 of the graphite particles in the first region is ≤−0.8.

11. The lithium-ion secondary battery according to claim 1, wherein:
the first region is a region extending to 30% of a thickness of the negative electrode active material layer from a surface of the negative electrode current collector; and
the second region is a region extending to 30% of the thickness of the negative electrode active material layer from the surface side of the negative electrode active material layer.

* * * * *